United States Patent
Yuan et al.

(10) Patent No.: US 12,486,549 B2
(45) Date of Patent: Dec. 2, 2025

(54) MODERATE-STRENGTH STEEL RAIL AND PRODUCTION METHOD THEREOF

(71) Applicant: PANGANG GROUP PANZHIHUA IRON & STEEL RESEARCH INSTITUTE CO., LTD., Panzhihua (CN)

(72) Inventors: Jun Yuan, Panzhihua (CN); Yong Deng, Panzhihua (CN); Chongmu Chen, Panzhihua (CN); Yuan Wang, Panzhihua (CN)

(73) Assignee: PANGANG GROUP PANZHIHUA IRON & STEEL RESEARCH INSTITUTE CO., LTD., Panzhihua (CN)

( * ) Notice: Subject to any disclaimer, the term of this patent is extended or adjusted under 35 U.S.C. 154(b) by 0 days.

(21) Appl. No.: 17/996,603

(22) PCT Filed: Jun. 30, 2022

(86) PCT No.: PCT/CN2022/102696
§ 371 (c)(1),
(2) Date: Oct. 19, 2022

(87) PCT Pub. No.: WO2023/077838
PCT Pub. Date: May 11, 2023

(65) Prior Publication Data
US 2024/0068063 A1    Feb. 29, 2024

(30) Foreign Application Priority Data
Nov. 3, 2021   (CN) .......................... 202111292347.4

(51) Int. Cl.
*C21D 9/04*     (2006.01)
*B21B 1/085*    (2006.01)
(Continued)

(52) U.S. Cl.
CPC ................ *C21D 9/04* (2013.01); *B21B 1/085* (2013.01); *C21D 1/18* (2013.01); *C21D 6/002* (2013.01);
(Continued)

(58) Field of Classification Search
None
See application file for complete search history.

(56) References Cited

FOREIGN PATENT DOCUMENTS

| CA | 2907609 A | 10/2014 |
|---|---|---|
| CN | 106086622 A | 11/2016 |

(Continued)

OTHER PUBLICATIONS

The State Intellectual Property Office of People's Republic of China, First Office Action in Patent Application No. CN2021112923473.4 issued on Jul. 30, 2022, which is a foreign counterpart application corresponding to this U.S. Patent Application, to which this application claims priority.

(Continued)

*Primary Examiner* — Jenny R Wu
(74) *Attorney, Agent, or Firm* — Kolitch Romano Dascenzo Gates LLC

(57) ABSTRACT

A moderate-strength steel rail is provided. The chemical composition of the moderate-strength steel rail in weight percentages includes carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 96.85-98.41 wt %. According to a production method for the moderate-strength steel rail of the present invention, the moderate-strength steel rail produced has a rail hardness of 350-370 HB, a wear amount of ≤0.40 g, a contact fatigue life of ≥50,000 times, and a 610 mm steel rail waist opening ≤3.0 mm/400 mm.

6 Claims, 7 Drawing Sheets

(51) Int. Cl.
*C21D 1/18* (2006.01)
*C21D 6/00* (2006.01)
*C21D 8/00* (2006.01)
*C22C 38/00* (2006.01)
*C22C 38/02* (2006.01)
*C22C 38/04* (2006.01)
*C22C 38/18* (2006.01)
*E01B 5/02* (2006.01)

(52) U.S. Cl.
CPC .............. *C21D 6/005* (2013.01); *C21D 6/008* (2013.01); *C21D 8/005* (2013.01); *C22C 38/002* (2013.01); *C22C 38/02* (2013.01); *C22C 38/04* (2013.01); *C22C 38/18* (2013.01); *E01B 5/02* (2013.01); *C21D 2221/00* (2013.01)

(56) References Cited

FOREIGN PATENT DOCUMENTS

| | | | |
|---|---|---|---|
| CN | 107675084 A | | 2/2018 |
| CN | 112195413 A | * | 1/2021 |
| CN | 112267063 A | * | 1/2021 |
| CN | 112458359 A | | 3/2021 |
| CN | 112501512 A | | 3/2021 |
| JP | 2002030341 A | | 1/2002 |

OTHER PUBLICATIONS

The State Intellectual Property Office of People's Republic of China, Second Office Action in Patent Application No. CN2021112923473.4 issued on Oct. 18, 2022, which is a foreign counterpart application corresponding to this U.S. Patent Application, to which this application claims priority.

* cited by examiner

Table 1 Chemical composition

| Items | No. | Chemical composition (%) | | | | | | | Gas content (ppm) | | Cost for each ton of steel alloy (RMB) |
|---|---|---|---|---|---|---|---|---|---|---|---|
| | | C | Si | Mn | P | S | Cr | Si+Mn+Cr | O | N | |
| Embodiments | 1 | 0.90 | 0.08 | 0.69 | 0.015 | 0.010 | 0.10 | 0.87 | 8 | 40 | 42 |
| | 2 | 0.87 | 0.10 | 0.80 | 0.016 | 0.008 | 0.12 | 1.02 | 7 | 45 | 50 |
| | 3 | 0.85 | 0.20 | 1.20 | 0.016 | 0.009 | 0.14 | 1.54 | 9 | 35 | 74 |
| | 4 | 0.82 | 0.30 | 1.30 | 0.017 | 0.011 | 0.16 | 1.76 | 10 | 30 | 85 |
| | 5 | 0.79 | 0.40 | 1.05 | 0.015 | 0.012 | 0.18 | 1.63 | 11 | 34 | 79 |
| | 6 | 0.76 | 0.50 | 1.10 | 0.014 | 0.010 | 0.20 | 1.80 | 12 | 35 | 87 |
| | 7 | 0.73 | 0.60 | 0.90 | 0.013 | 0.011 | 0.22 | 1.72 | 10 | 45 | 84 |
| | 8 | 0.70 | 0.65 | 1.00 | 0.014 | 0.012 | 0.25 | 1.90 | 12 | 51 | 92 |
| Comparative examples | 1 | 0.76 | 0.50 | 1.00 | 0.012 | 0.010 | 0.05 | 1.55 | 9 | 41 | 74 |
| | 2 | 0.76 | 0.70 | 0.90 | 0.018 | 0.011 | 0.30 | 1.90 | 7 | 42 | 93 |
| | 3 | 0.76 | 0.80 | 1.10 | 0.015 | 0.011 | 0.25 | 2.15 | 8 | 35 | 104 |
| | 4 | 0.76 | 0.50 | 1.10 | 0.014 | 0.010 | 0.20 | 1.80 | 11 | 35 | 87 |
| | 5 | 0.76 | 0.50 | 1.10 | 0.014 | 0.010 | 0.20 | 1.80 | 12 | 36 | 87 |
| | 6 | 0.76 | 0.50 | 1.10 | 0.014 | 0.010 | 0.20 | 1.80 | 9 | 38 | 87 |
| | 7 | 0.76 | 0.50 | 1.10 | 0.014 | 0.010 | 0.20 | 1.80 | 15 | 37 | 87 |
| | 8 | 0.76 | 0.50 | 1.10 | 0.014 | 0.010 | 0.20 | 1.80 | 10 | 39 | 87 |
| | 9 | 0.76 | 0.50 | 1.10 | 0.014 | 0.010 | 0.20 | 1.80 | 11 | 34 | 87 |
| | 10 | 0.76 | 0.50 | 1.10 | 0.014 | 0.010 | 0.20 | 1.80 | 12 | 35 | 87 |
| | 11 | 0.76 | 0.50 | 1.10 | 0.014 | 0.010 | 0.20 | 1.80 | 11 | 36 | 87 |
| | 12 | 0.76 | 0.50 | 1.10 | 0.014 | 0.010 | 0.20 | 1.80 | 12 | 37 | 87 |
| | 13 | 0.76 | 0.50 | 1.10 | 0.014 | 0.010 | 0.20 | 1.80 | 11 | 37 | 87 |
| | 14 | 0.76 | 0.50 | 1.10 | 0.014 | 0.010 | 0.20 | 1.80 | 12 | 38 | 87 |
| | 15 | 0.76 | 0.50 | 1.10 | 0.014 | 0.010 | 0.20 | 1.80 | 9 | 39 | 87 |
| | 16 | 0.76 | 0.50 | 1.10 | 0.014 | 0.010 | 0.20 | 1.80 | 8 | 40 | 87 |
| | 17 | 0.76 | 0.50 | 1.10 | 0.014 | 0.010 | 0.20 | 1.80 | 6 | 41 | 87 |

FIG. 1

Table 2 Heat treatment process

| Items | No. | On-line heat treatment process ||||| 
|---|---|---|---|---|---|---|
| | | Rolling final cooling temperature (°C) | Rail head tread width (mm) | Rail head tread cooling rate (°C/s) | Width of both sides of rail head (mm) | Cooling rate at both sides of rail head (°C/s) |
| Embodiments | 1 | 620 | 50 | 1 | 20 | 2 |
| | 2 | 640 | 52 | 1.5 | 22 | 2.5 |
| | 3 | 660 | 54 | 2.0 | 24 | 3.0 |
| | 4 | 680 | 56 | 2.5 | 26 | 3.5 |
| | 5 | 700 | 58 | 3.0 | 28 | 4.0 |
| | 6 | 720 | 56 | 3.5 | 26 | 4.5 |
| | 7 | 740 | 58 | 3.5 | 28 | 5.5 |
| | 8 | 780 | 60 | 4 | 30 | 6 |
| Comparative examples | 1 | 700 | 58 | 3.0 | 28 | 4.0 |
| | 2 | 700 | 58 | 3.0 | 28 | 4.0 |
| | 3 | 700 | 58 | 3.0 | 28 | 4.0 |
| | 4 | 600 | 58 | 3.0 | 28 | 4.0 |
| | 5 | 800 | 58 | 3.0 | 28 | 4.0 |
| | 6 | 700 | 40 | 3.0 | 28 | 4.0 |
| | 7 | 700 | 70 | 3.0 | 28 | 4.0 |
| | 8 | 700 | 58 | 0.9 | 30 | 4.0 |
| | 9 | 700 | 58 | 5.0 | 30 | 4.0 |
| | 10 | 700 | 58 | 3.0 | 15 | 4.0 |
| | 11 | 700 | 58 | 3.0 | 35 | 4.0 |
| | 12 | 700 | 58 | 3.0 | 28 | 1.5 |
| | 13 | 700 | 58 | 3.0 | 28 | 6.5 |
| | 14 | 700 | 58 | 3.0 | 28 | 4.0 |
| | 15 | 700 | 58 | 3.0 | 28 | 4.0 |
| | 16 | 700 | 58 | 3.0 | 28 | 4.0 |
| | 17 | 700 | 58 | 3.0 | 28 | 4.0 |

FIG. 2

Table 3a Tread hardness, residual stress, straightness, and wear and contact fatigue of Embodiments of the Present Disclosure

| No | Metallographic structure | Tread Hardness HBW10/3000 | | | | | | Wear data | | | Contact fatigue life (times) |
|---|---|---|---|---|---|---|---|---|---|---|---|
| | | 1 | 2 | 3 | 4 | 5 | Average | Load/N | Revolutions/ 10,000 times | Wear amount/g | |
| 1 | P + micro secondary cementite | 350 | 351 | 350 | 351 | 350 | 350.4 | 980 | 10 | 0.40 | 42123 |
| 2 | P + micro secondary cementite | 355 | 354 | 354 | 355 | 354 | 354.4 | 980 | 10 | 0.39 | 52158 |
| 3 | P | 359 | 357 | 358 | 359 | 358 | 358.2 | 980 | 10 | 0.39 | 51234 |
| 4 | P | 361 | 363 | 364 | 363 | 364 | 363.0 | 980 | 10 | 0.38 | 65812 |
| 5 | P | 366 | 365 | 366 | 365 | 366 | 365.6 | 980 | 10 | 0.37 | 71254 |
| 6 | P | 368 | 368 | 367 | 364 | 365 | 366.4 | 980 | 10 | 0.37 | 72314 |
| 7 | P | 365 | 365 | 365 | 365 | 365 | 365.0 | 980 | 10 | 0.37 | 71254 |
| 8 | P | 370 | 369 | 368 | 369 | 370 | 369.2 | 980 | 10 | 0.38 | 63254 |

FIG. 3A

Table 3b Tread hardness, residual stress, straightness, and wear and contact fatigue of Comparative Examples

| No | Metallographic structure | Tread Hardness HBW10/3000 | | | | | | Wear data | | | Contact fatigue life (times) |
|---|---|---|---|---|---|---|---|---|---|---|---|
| | | 1 | 2 | 3 | 4 | 5 | Average | Load/N | Revolutions/ 10,000 times | Wear amount/g | |
| 1 | P | 345 | 346 | 346 | 347 | 345 | 345.8 | 980 | 10 | 0.45 | 25314 |
| 2 | P | 375 | 375 | 376 | 374 | 376 | 375.2 | 980 | 10 | 0.30 | 81254 |
| 3 | P | 365 | 365 | 365 | 365 | 364 | 364.8 | 980 | 10 | 0.38 | 64253 |
| 4 | P | 330 | 331 | 332 | 330 | 331 | 330.8 | 980 | 10 | 0.50 | 22124 |
| 5 | P | 341 | 347 | 346 | 346 | 344 | 344.8 | 980 | 10 | 0.45 | 23125 |
| 6 | P | 349 | 348 | 369 | 368 | 347 | 356.2 | 980 | 10 | 0.39 | 51234 |
| 7 | P | 374 | 375 | 374 | 375 | 374 | 374.4 | 980 | 10 | 0.35 | 75621 |
| 8 | P | 345 | 344 | 346 | 346 | 345 | 345.2 | 980 | 10 | 0.46 | 26453 |
| 9 | P (pearlite) + M (martensite) | 381 | 384 | 386 | 384 | 384 | 383.8 | 980 | 10 | 0.29 | 76254 |
| 10 | P | 346 | 346 | 371 | 346 | 347 | 351.2 | 980 | 10 | 0.38 | 49641 |
| 11 | P | 374 | 374 | 375 | 376 | 377 | 375.2 | 980 | 10 | 0.28 | 77512 |
| 12 | P | 346 | 344 | 345 | 345 | 344 | 344.8 | 980 | 10 | 0.46 | 25632 |
| 13 | P+M | 377 | 378 | 378 | 377 | 378 | 377.6 | 980 | 10 | 0.39 | 62453 |
| 14 | P | 361 | 366 | 364 | 364 | 361 | 363.2 | 980 | 10 | 0.38 | 66521 |
| 15 | P | 365 | 364 | 366 | 361 | 365 | 364.2 | 980 | 10 | 0.37 | 69641 |
| 16 | P | 364 | 365 | 364 | 363 | 364 | 364.0 | 980 | 10 | 0.37 | 65212 |
| 17 | P | 365 | 365 | 364 | 365 | 366 | 365.0 | 980 | 10 | 0.37 | 65213 |

FIG. 3B

MODERATE-STRENGTH STEEL RAIL AND PRODUCTION METHOD THEREOF

TECHNICAL FIELD

The present disclosure relates to the field of metallic materials, and in particular to a moderate-strength steel rail and a production method thereof.

BACKGROUND

With the increase of railway traffic volume at home and abroad, the increase of axle load and the increase of speed, the requirements for steel rail quality or performance become higher and higher. Meanwhile, with the expansion of domestic and foreign rail manufacturers' capacity and technological innovation, the situation of steel rail supply exceeding demand is further expanded, and low-cost and high-performance steel rails become the first choice for mainstream railways.

According to the transportation conditions, the railways are divided into a passenger transport line railway, freight transport line railway, and a mixed passenger and freight transport railway. At home and abroad, the passenger transport line and the mixed passenger and freight transport line are the main lines, accounting for more than 90%. Steel rails for the passenger transport line and the mixed passenger and freight transport line should consider factors such as a steel rail strength level, a transportation volume, cost economy. By improving the rail performance, reducing the rail weight and reducing the rail usage, it becomes the trend of economic and efficient steel rails. Generally, the single weight of steel rail for the passenger transport line and the mixed passenger and freight transport railway is ≤60 kg/m. By rail service tracking at home and abroad, the rail strength grade selected as H350-H370 can fully meet the requirements of steel rails for the passenger transport line and the mixed passenger and freight transport transportation line.

SUMMARY

To address some issues in the prior art, it is an object of the present disclosure to provide a moderate-strength steel rail and a production method thereof. The toughness of the steel rail is improved while the strength of the rail is ensured. A steel rail with a unit weight of ≤60 kg/m and a strength grade of H350-H370 is produced.

In order to achieve the above object, the technical solutions provided by the the present disclosure are as follows.

A moderate-strength steel rail is provided. The chemical composition of the moderate-strength steel rail includes carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 96.85-98.41 wt %.

Further, the sum of the weight percentages of silicon and manganese and chromium in the moderate-strength steel rail is less than or equal to 1.9 wt %.

Further, the moderate-strength steel rail has a hardness of 350-370 HB.

Further, the wear amount of the moderate-strength steel rail is ≤0.40 g.

A production method for a moderate-strength steel rail comprises the steps of:

step 1, smelting and casting a steel billet of the above-mentioned moderate-strength steel rail;

step 2, heating and rolling the steel billet into the moderate-strength steel rail;

step 3, performing heat treatment on the moderate-strength steel rail by using the rolling residual heat; and step 4, applying accelerated cooling to a whole section of the moderate-strength steel rail after the heat treatment.

Further, in the step 2, the billet is heated at a temperature of 1200-1250° C. and maintained at a heat preservation time of 150 to 240 min in a soaking segment.

Further, in the step 3, the rolling residual heat temperature is 620-780° C.

Further, in the step 3, a cooling strength of 1-4° C./s is applied to a width of 50-60 mm of a rail head tread of the moderate-strength steel rail.

Further, in the step 3, a cooling strength of 2-6° C./s is applied to a width of 20-30 mm at both sides of the rail head of the moderate-strength steel rail.

Further, in the step 4, 1-3° C./s accelerated cooling is applied to a whole section of the moderate-strength steel rail.

BRIEF DESCRIPTION OF THE DRAWINGS

FIG. 1 shows Table 1 which lists the chemical compositions of the embodiments of the present disclosure and comparative examples;

FIG. 2 shows Table 2 which summarizes the heat treatment processes applied to moderate-strength steel rail according to the embodiment of the present disclosure and the steel rail of comparative examples;

FIG. 3A shows Table 3A, which summarizes tread hardness, wear data and contact fatigue of the moderate-strength steel rail according to the embodiments of the present disclosure;

FIG. 3B shows Table 3B, which summarizes tread hardness, wear data and contact fatigue of the comparative examples;

DETAILED DESCRIPTION

Figure 4:
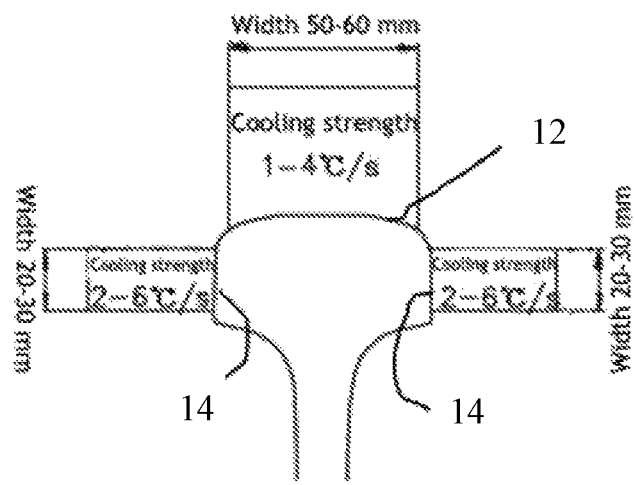
FIG. 4 is a schematic view showing a heat treatment position of a moderate-strength steel rail according to the present disclosure.

In order that the objects, technical solutions, and advantages of the present invention will become more apparent, a more particular description of the invention will be rendered by reference to the appended drawings and embodiments. It should be understood that the specific embodiments described herein are merely illustrative of the invention and are not intended to be limiting thereof.

Common elements in steel rails are carbon, silicon, manganese, phosphorus, sulfur, and chromium. Among them, carbon is the most influential element and also the most economical element. Chromium can improve the depth of hardening layer of the steel rail and ensure good service performance of the rail.

Carbon (C): carbon is the most important alloying element in steel, and its content and distribution form have an important influence on the microstructure and mechanical properties of steel. Carbon is an austenite stabilizing element. With the increase of carbon content, the stability of undercooled austenite increases, the position of C curve moves to the right, the critical starting temperature of martensitic transformation decreases, and the incubation period of bainite increases. Carbon is also a strong interstitial solid solution strengthening element, which can strongly improve the strength of steel.

Silicon (Si): silicon is added as a reducing agent and a deoxidizer in the steelmaking process. The substitutional solid solution by silicon exists in ferrite or high-temperature austenite, which narrows the austenite phase region. The addition of silicon slows down the diffusion of carbon atoms and prevents the precipitation of carbides. The hardness and strength of ferrite and austenite are increased by silicon to be stronger than that by manganese, nickel, chromium, tungsten, aluminum and vanadium, which significantly increases the elastic limit, yield strength and yield strength ratio of steel and improves the fatigue property.

Manganese (Mn) manganese is a good deoxidizer and desulfurizer in the process of steelmaking Manganese can improve the hardenability and hot workability of steel. Manganese, as a weak carbide-forming element and an austenite stabilizing element, has weak diffusion resistance to carbide in the matrix, but its strong solute "drag-like" effect will hinder the further decomposition of carbon-rich austenite.

Phosphorus (P): in general, phosphorus is a harmful element in steel, increasing cold brittleness of steel, deteriorating welding performance, reducing plasticity, and deteriorating cold bending performance.

Sulfur (S): sulfur is also a harmful element under normal circumstances. Hot brittleness of the steel is caused, ductility and toughness of the steel are reduced, and cracks are caused during forging and rolling. Sulfur is also detrimental to weldability, reducing corrosion resistance.

Chromium (Cr): chromium can increase austenite phase-transition temperature and postpone high temperature phase-transition reaction. The specific effect of chromium on the phase transition is as follows. Chromium is a ferrite stabilizing element, which can reduce the austenite region and increase the austenite phase-transition temperature. Chromium can reduce the diffusion rate of carbon atoms in the austenite. The diffusion rate of chromium in the austenite is 3-5 orders of magnitude lower than that of carbon. The redistribution of alloying elements in the bainite transformation process at higher temperature delays the phase transition from undercooled austenite to bainite controlled by diffusion mechanism due to the diffusion rate difference between chromium and carbon. Chromium can increase the activation energy of auto-diffused iron atom and decrease the coordination of iron atom diffusion, so it can postpone the high temperature phase-transition of ultrafast cooling austenite. Chromium is a strong carbide-forming element, and the combination of chromium and carbon atoms tends to be strong, which increases the difficulty of advancing the coherent phase boundary, thus delaying the bainite transformation process.

By regression analysis of the composition and performance data, the moderate-strength steel rail composition of the present disclosure includes carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 98.41-96.85 wt %.

The moderate-strength steel rail of the present disclosure has the following beneficial effects.

The moderate-strength steel rail and the production method thereof of the present disclosure provide a moderate-strength steel rail with low-cost composition and production of long steel rail. Heat treatment is performed by the rolling residual heat treatment to improve the rail performance and simultaneously reduce the tread hardness, ensure cooling uniformity of the rail head tread and rail bottom, and reduce the rail residual stress by considering the application of steel on the railway, so as to meet the operating requirements for low-cost and high-performance steel rails. The moderate-strength steel rail of the present disclosure has a rail hardness of 350-370 HB, a wear amount of ≤0.40 g, a contact fatigue life of ≥50,000 times, and a 610 mm steel rail waist opening degree of ≤3.0 mm/400 mm, which is a low-cost, maintenance-free and long-life steel rail for railway use.

The moderate-strength steel rail is mainly used for passenger transport line or mixed passenger and freight transport railway, which solves demand of most of the international railway line. The moderate-strength steel rail produced by the method of the present disclosure is particularly suitable for steel rails used in low-cost high-manpower remote railway lines with annual transportation of 20,000,000-50,000,000 tons, and has good economic benefits and market prospects.

Because of its moderate strength, excellent wear resistance and fatigue performance, and low cost, the moderate-strength rails will be laid in countries, such as, North America, south America and Australia in the future. It is also the main product from Pan'gang Group, which has good economic benefits and market prospects. According to the statistical data of the International Trade Company in December 2020, the marginal benefits of steel rails reaches 1,000 yuan/ton, and at least 30,000,000 yuan of new economic benefits can be added when it is calculated as 30,000 tons of annual output after successful promotion. Meanwhile, the promotion and application of a full range of steel rail products from Pan' gang Group will be promoted.

According to some embodiments of the present disclosure, a moderate-strength steel rail chemical composition of the moderate-strength steel rail in weight percentages comprises carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 96.85-98.41 wt %. The sum of the weight percentages of silicon and manganese and chromium in the moderate-strength steel rail is less than or equal to 1.9 wt %.

The moderate-strength steel rail of the present disclosure has a rail hardness of 350-370 HB (Brinell hardness), a wear amount of ≤0.40 g, a contact fatigue life of ≥50,000 times, and a 610 mm steel rail waist opening ≤3.0 mm/400 mm. It is especially suitable for steel rails used in low-cost high-manpower remote railway lines with annual traffic volume between 20,000,000 and 40,000,000 tons.

The present disclosure provides a production method for a moderate-strength steel rail, including the steps of:
  step 1, steel having the chemical composition of the moderate-strength steel rail of the present disclosure is smelted and casted to form steel billet, wherein the chemical composition of the moderate-strength steel rail in weight percentages includes carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 96.85-98.41 wt %;
  step 2, the steel billet is heated, the heating temperature of the steel billet is 1200-1250° C., the heat preservation time is 150-240 minutes in a soaking segment, and the steel billet is rolled to obtain the moderate-strength steel rail;

step 3, heat treatment is performed on the moderate-strength steel rail by using the rolling residual heat, wherein the rolling residual heat temperature is 620-780° C., a cooling rate of 1-4° C./s is applied to a width of 50-60 mm of a rail head tread of the moderate-strength steel rail, and a cooling rate of 2-6° C./s is applied to a width of 20-30 mm at both sides of the rail head of the moderate-strength steel rail; and step 4, accelerated cooling is applied to a whole section of the moderate-strength steel rail after step 3 or after the heat treatment, and 1-3° C./s accelerated cooling is applied to the whole section of the moderate-strength steel rail.

Hardness is directly related to wear, which interacts with contact fatigue properties. By reasonable design of the rail head tread hardness interval and reasonable design of rail wear balanced with the contact fatigue properties, the performance the comprehensive service performance of steel rails can be improved.

Figure 5:
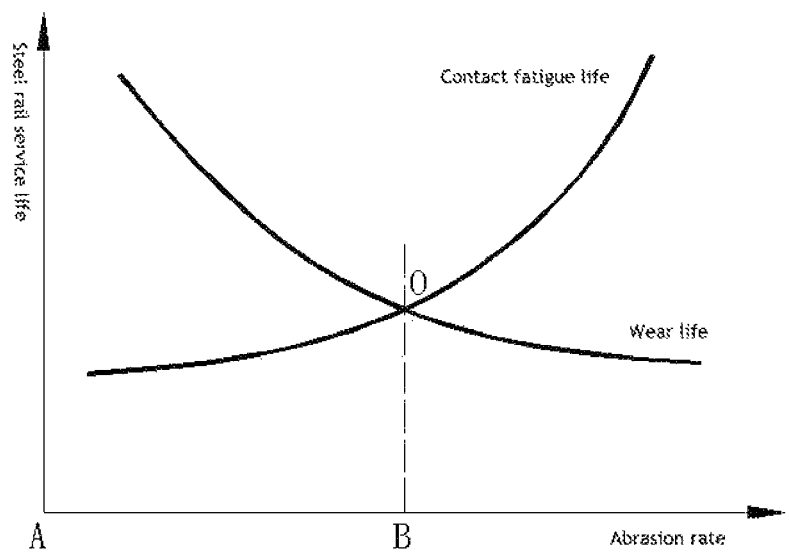
FIG. 5 is a schematic view showing the balance of wear vs. contact fatigue crack propagation rate.

When the rail strength is low, the wear amount increases and the wear resistance is insufficient. When the strength of the steel rail is high, the wear resistance is improved, however, the surface layer of the rail surface cannot be worn away in time, and the plasticity is exhausted under the repeated action of the contact stress, resulting in the generation and propagation of cracks. To have a good overall balance between wear life and contact fatigue life, the abrasion rate should be controlled. FIG. 5 is a schematic graph showing the balance of wear vs. contact fatigue crack propagation rate. As can be seen from FIG. 5, as the abrasion rate increases, the contact fatigue life increases while the wear life decreases. An ideal location or the balancing point is the point "B" in FIG. 5. To achieve this, the steel rail strength should be properly designed.

Some embodiments of the moderate-strength steel rail according to the present disclosure are described below.

The chemical composition and weight percentages of the moderate-strength steel rail according to the example embodiments of the present disclosure and the steel rail in the comparative examples are shown in Table 1 in FIG. 1. The chemical compositions by weight percentages in the examples of the present disclosure are: carbon 0.70-0.90 wt %, silicon 0.08-0.65 wt %, manganese 0.69-1.30 wt %, chromium 0.10-0.25 wt %, phosphorus 0.013-0.017 wt %, sulphur 0.008-0.012 wt %, the rest of the composition being iron. The sum of silicon, manganese and chromium by weight percentages is 0.87-1.90 wt %, and the cost per ton of steel alloy is 42-92 RMB/ton.

The chemical compositions by weight percentages in the comparative examples are: carbon 0.76 wt %, silicon 0.5-0.8 wt %, manganese 0.9-1.1 wt %, chromium 0.05-0.30 wt %, phosphorus 0.012-0.018 wt %, sulphur 0.010-0.011 wt %, and the rest of composition being iron. The sum of silicon, manganese and chromium by weight percentages is 1.55-2.15 wt %, and the cost per ton of steel alloy is 74-104 RMB/ton.

The production method for the moderate-strength steel rail according to the present disclosure is described below. The steel with chemical compositions according to the embodiment of the present disclosure (e.g., the steel with the chemical compositions described above and listed in Table 1 in FIG. 1) are smelted and cast into steel billets. The steel billets are heated, the heating temperature of the steel billet is 1200-1250° C., the heat preservation time is 150-240 min in a soaking segment, and the steel billets are rolled to form the moderate-strength steel rail. The moderate-strength steel rail after rolling is heat treated by different heat treatment processes using the rolling residual heat, and the heat treatment process is shown in Table 2 in FIG. 2.

The comparative examples of steels rail with the chemical compositions in weight percentages of listed in Table 1 in FIG. 1 are smelted and cast into steel billets. The steel billets are heated, the heating temperature of the steel billet is 1200-1250° C., the heat preservation time is 150-240 min in a soaking segment, and the steel billets are rolled to form the steel rail. The steel rail after rolling is heat treated by different heat treatment processes using the rolling residual heat, and the heat treatment process is shown in Table 2 in FIG. 2.

In the embodiments of the present disclosure, the final cooling temperature during rolling of the moderate-strength steel rail is 620-780° C. In the embodiments of the moderate-strength steel rail illustrated in FIG. 4 the width of the rail head tread 12 is 50-60 mm, and the width of both sides 14 of the rail head is 20-30 mm. The cooling rate of the rail head tread is 1-4° C./s, and the cooling rate of both sides of the rail head is 2-6° C./s.

In the comparative example, the final cooling temperature during rolling of the steel rail rolling is 600-800° C., the width of the rail head tread is 40-70 mm, the cooling rate of the rail head tread is 0.9-5° C./s, the width of both sides of the rail head is 15-35 mm, and the cooling rate at both sides of rail head is 1.5-6.5° C./s.

The oxygen content and nitrogen content of the moderate-strength steel rail in the embodiments of the present disclosure and the steel rail in the comparative examples are tested as shown in Table 1 in FIG. 1. The moderate-strength steel rail in the embodiments of the present disclosure has an oxygen content of 7-12 ppm and a nitrogen content of 30-51 ppm. The steel rail in the comparative examples has an oxygen content of 6-15 ppm and a nitrogen content of 34-42 ppm.

The HBW10/3000 Brinell hardness test is performed on the tread positions of the rail head of rails in the embodiments of the present disclosure and comparative examples according to the TB/T 2344-2012 standard. The test results are shown in Table 3A in FIG. 3A and Table 3B in FIG. 3B, respectively. The average hardness of the tread in the moderate-strength steel rail of the embodiments of the present disclosure is 350.4-369.2 HBW 10/3000; and the average hardness of the tread of the rail in the comparative examples is 330.8-383.8 HBW 10/3000.

The moderate-strength steel rails of the embodiments of the present disclosure and the steel rail samples of the comparative examples are tested on an MM-200 abrasion tester using a double-disc relative abrasion at 200 rpm. The U75V hot-rolled rail samples are relative abrasion samples located on the driving shaft to simulate wheels. The samples of the moderate-strength steel rail of the present disclosure and the steel rail samples of the comparative example are positive abrasion samples located on a driven shaft to simulate steel rails. The diameters of the relative abrasion and positive abrasion samples are both 36 mm Wear tests are conducted at different loads and at different revolutions at a relative slip differential of 10%. As shown in Table 3A in FIG. 3A and Table 3B in FIG. 3B, P represents pearlite and M represents martensite. In the embodiments of the present disclosure, the moderate-strength steel rail has a wear load of 980 N, a number of revolutions of 100,000 times, a wear amount of 0.37-0.40 g, and a contact fatigue life of 42,123-72,314 times. In the comparative examples, the steel rail has a wear load of 980N, a number of revolutions of 100,000 times, a wear amount of 0.28-0.50 g, and a contact fatigue life of 22,124-81,254 times.

Figure 6:
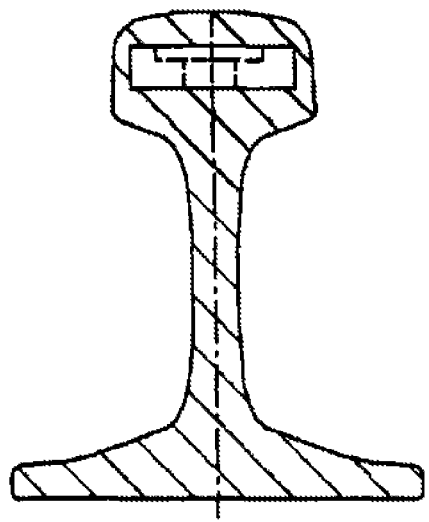
FIG. 6 shows a schematic view of a sampling location for rolling contact fatigue samples used in the present disclosure.
Figure 7A:
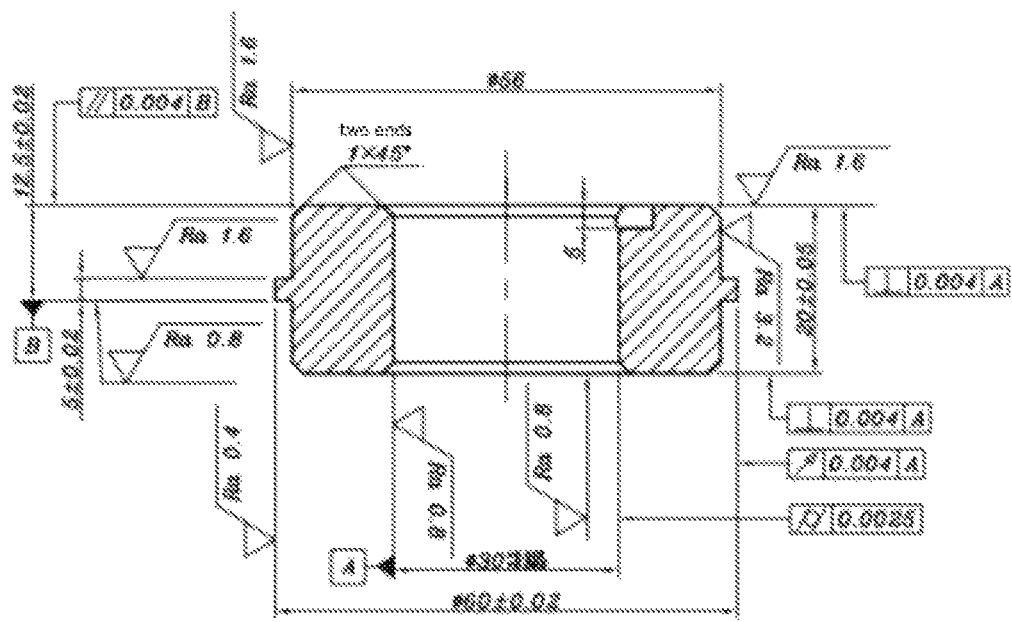
FIG. 7A shows a cross-sectional view of a rolling contact fatigue sample dimension used in the present disclosure.
Figure 7B:
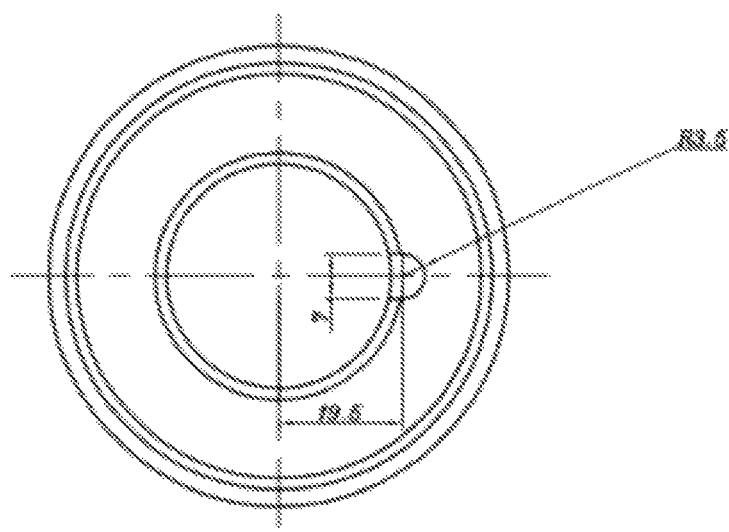
FIG. 7B shows a top view of a rolling contact fatigue sample dimension used in the present disclosure.

The contact fatigue test is made in the steel rail according to FIG. 6, and the samples are prepared according to FIGS. 7A and 7B. The U75V hot rolled steel rail samples are performed with sample abrasion on the TIME M8123 rolling contact fatigue wear tester. The contact stress is 1,400 Mpa, the rotation speed is 400 rpm, the slip differential is 1%, and the dry grinding method is used. The fatigue life is determined according to the vibration signal of 3 mm/s.

In the present disclosure, low-cost chromium microalloying composition smelting, steel billet heating and rolling are performed. The heat treatment is performed using the rolling residual heat. A carbon-chromium-cooling rate relationship is adopted, and the system controls the critical cooling rate of the steel rail to be 6° C./s. The strength of the rail head is improved by the heat treatment cooling position and heat treatment cooling width on the rail head to ensure the line operation requirements for the steel rails. According to the operation characteristics of passenger transport line railways and mixed passenger and freight transport railways, the hardness of the top surface of the rail head is reduced to ensure that the steel rail has a good wheel-rail matching relationship. By the same accelerated cooling mode between the top surface of rail head and the low center of rail, the consistency of cooling and bending deformation of steel rails is ensured, the residual stress of steel rails is reduced, and the safe operation of steel rails is ensured.

In the present disclosure, based on the conditions of a steel rail line for a passenger transport line and a mixed passenger and freight transport railway, and in combination with the characteristics of the relationship between wear and contact fatigue, the optimal strength index H350-H370 grade of the steel rail is designed, and the chemical composition of the steel rail and the corresponding heat treatment process are designed. By the heat treatment process, the strength of the steel rail is improved, the residual stress and the straightness of the steel rail are reduced, and the safety and the smooth of the line are ensured.

The embodiments of the present disclosure described above represent only embodiments of the invention, which are described specifically and in detail, but are not to be construed as limiting the scope of the invention patent. It should be noted that a person of ordinary skill in the art would have been able to make several variations and improvements without departing from the concept of the present invention, which falls within the scope of the present disclosure.

The invention claimed is:

1. A production method for a steel rail, comprising:
smelting and casting steel to form steel billet, wherein the steel has the following chemical compositions in weight percentages: carbon 0.70-0.90 wt %, silicon 0.08-0.65 wt %, manganese 0.69-1.31 wt %, chromium 0.10-0.25 wt %, phosphorus ≤0.020 wt %, sulfur ≤0.020 wt %, and iron 96.85-98.41 wt %;
heating and rolling the steel billet into the steel rail;
performing heat treatment on the steel rail by using rolling residual heat; and
applying accelerated cooling to a whole section of the steel rail after the heat treatment;
wherein the steel billet is heated at a temperature of 1200-1250° C. and maintained at a holding time of 150-240 min in a soaking segment;
wherein temperature of the rolling residual heat is 620-780° C. while the heat treatment is performed; and
wherein a cooling rate of 1-4° C./s is applied to a width of 50-60 mm of a rail head tread of the steel rail while the heat treatment is performed.

2. The production method for the steel rail according to claim 1, wherein a cooling rate of 2-6° C./s is applied to a width of 20-30 mm at both sides of rail head of the steel rail while the heat treatment is performed.

3. The production method for the steel rail according to claim 2, wherein 1-3° C./s accelerated cooling is applied to a whole section of the steel rail while the accelerated cooling is applied to a whole section of the steel rail after the heat treatment.

4. The production method for the steel rail according to claim 1, wherein a sum of weight percentages of silicon, manganese and chromium is less than or equal to 1.9 wt %.

5. The production method for the steel rail according to claim 1, wherein the steel rail has a hardness of 350-370 HB.

6. The production method for the steel rail according to claim 1, wherein wear amount of the steel rail is ≤0.40 g.

* * * * *